2,845,355

STABILIZATION OF CITRUS CONCENTRATES WITH FUMARIC ACID OR ITS SALTS

Robert J. McColloch, Pasadena, and Bruno Gentili, Glendale, Calif., assignors to the United States of America as represented by the Secretary of Agriculture No Drawing. Application July 11, 1956
Serial No. 597,306

6 Claims. (Cl. 99—155)

(Granted under Title 35, U. S. Code (1952), sec. 266)

A non-exclusive, irrevocable, royalty-free license in the invention herein described, throughout the world for all purposes of the United States government, with the power to grant sub-licenses for such purposes, is hereby granted to the Government of the United States of America.

This invention relates in general to the production of stabilized citrus juice concentrates. A particular object of the invention is the provision of citrus juice concentrates which can be stored without cloud loss. Another object of the invention is the provision of methods for producing such stabilized concentrates. Further objects and advantages of the invention will be obvious from the description herein.

It is well known in the art that freshly prepared citrus juices are not clear but contain a cloud of pulp and colloidal material suspended in the juice serum. It is generally recognized that most of the flavor is associated with the cloud material rather than with the clear serum. It is obvious that to receive consumer acceptance, a concentrated citrus juice product must form a reconstituted juice having the characteristic cloud of the freshly prepared juice.

At the present time, citrus juices are preserved on a large scale in the form of 4-fold (42° Brix) frozen concentrates. Although these products have received wide acceptance, there is one problem that has always beset the industry. This problem concerns the fact that on storage the concentrates tend to lose their cloud (the suspended pulp tends to clot and settle out). This detrimental effect is accelerated by increased storage temperature. The effect of temperature on the cloud stability of unheated orange juice concentrate is illustrated by the following table:

TABLE 1

Cloud retention of 4-fold orange juice concentrate

| Storage Conditions | Percentage of Cloud Retained |
|---|---|
| 100 days at 10° F | 75 |
| 100 days at 20° F | 20 |
| 5 days at 40° F | 15 |

The changes in the nature of the concentrate illustrated above are deleterious because the concentrate will no longer produce a reconstituted juice with a characteristic cloud. Thus the reconstituted juice will have a curdy appearance and pulp will settle out rapidly when the juice is not kept agitated, leaving a relatively clear supernatant liquid.

Since cloud loss is generally believed to be the result of pectic enzyme activity on the natural pectin in the juice, heat treatment (pasteurization) of the juice is employed commercially to inactivate the pectic enzymes in order to prevent or inhibit cloud loss and gelation. However, such heat treatment does not necessarily prevent cloud loss even when pectic enzymes appear to be completely inactivated. In addition, heat treatments necessary to completely inactivate the pectic enzymes result in the development of "cooked" or other off-flavors in the concentrate.

It has now been found that cloud loss can be greatly inhibited by adding to the concentrate a minor amount of fumaric acid or non-toxic salts thereof. The effect of these compounds on the stability of the concentrate is demonstrated in the examples below. The reason why fumaric acid and its salts possess the ability to stabilize the concentrate is not known. From a practical standpoint, however, it has been found that they are effective in this regard. It may also be noted that this activity of fumaric acid and its salts is unique; other polycarboxylic acids which we have tested exhibit no stabilizing effect and indeed some of them, notably malic acid, will accelerate cloud loss.

The invention is further demonstrated by the following illustrative examples.

EXAMPLE I

A supply of unheated 4-fold orange juice concentrate was divided into a series of samples. To these samples was added fumaric acid or disodium fumarate in the proportions given below. The samples of concentrate containing the additives and a sample of the original concentrate (control) were then stored at 86° F. This storage temperature was used as representing accelerated deleterious conditions since it has been found that in general one hour of storage at 86° F. produces approximately the cloud loss which will occur in 12 to 24 hours at 40° F. It is obvious that in actual use of the process of the invention the product would be stored at a temperature of about 0° F. as is conventional in the storage of frozen citrus concentrates.

After varying periods of storage, the samples of concentrate were removed from storage and reconstituted juices prepared therefrom and the cloud in the reconstituted juice measured. The cloud measurements were made by centrifuging a sample of reconstituted juice for 15 minutes at 2,000 R. P. M. and the turbidity of the supernatant liquid was then determined with a photometric colorimeter using a red #66 filter. Such measurements made on the concentrates before and after storage were used to calculate the percentage of cloud retained by each sample. For instance, if the colorimeter readings on the unstored and stored products are 370 and 285, respectively, then percentage of cloud retained in the stored product is 77%.

The results obtained are tabulated below:

TABLE 2

Inhibition of cloud loss by added fumarate in unheated orange concentrate held at 86° F.

| Expt. No. | Additive | Proportion of additive based on weight of concentrate, percent | Percentage of cloud retained after storage for— | |
|---|---|---|---|---|
| | | | 2 hours | 4 hours |
| 1 | none (control) | none | 60 | 20 |
| 2 | fumaric acid | 0.29 | 67 | 39 |
| 3 | do | 0.58 | 69 | 42 |
| 4 | disodium fumarate | 0.40 | 79 | 48 |
| 5 | do | 0.80 | 84 | 59 |

EXAMPLE II

The experiments set forth in Example I were repeated except that in this case the concentrate was heated for 1 second at 150° F. before addition of the additives. The results obtained are tabulated below:

TABLE 3

*Inhibition of cloud loss by added fumarate in heat-treated (1 sec. at 150° F.) orange concentrate held at 86° F.*

| Expt. No. | Additive | Proportion of additive based on weight of concentrate, percent | Percentage of cloud retained after storage for— | |
|---|---|---|---|---|
| | | | 5 hours | 7 hours |
| 6 | none (control) | none | 48 | 34 |
| 7 | fumaric acid | 0.29 | 60 | 51 |
| 8 | do | 0.58 | 74 | 62 |
| 9 | disodium fumarate | 0.40 | 79 | 67 |
| 10 | do | 0.80 | 88 | 81 |

EXAMPLE III

The experiments set forth in Example I were repeated except that in this case the concentrate samples, with and without additives, were stored at 40° F. The results obtained are tabulated below:

TABLE 4

*Inhibition of cloud loss by added fumarate in unheated orange concentrate held at 40° F.*

| Expt. No. | Additive | Proportion of additive based on weight of concentrate, percent | Percentage of cloud retained after storage for— | | | |
|---|---|---|---|---|---|---|
| | | | 1 day | 2 days | 3 days | 4 days |
| 11 | none (control) | none | 39 | 20 | 11 | 8 |
| 12 | fumaric acid | 0.29 | 61 | 43 | 32 | 19 |
| 13 | do | 0.58 | 82 | 51 | 35 | 26 |
| 14 | disodium fumarate | 0.40 | 90 | 69 | 57 | 43 |
| 15 | do | 0.80 | 90 | 77 | 63 | 50 |

EXAMPLE IV

The experiments set forth in Example I were repeated except that in this case the concentrate was heated for 1 second at 150° F. before addition of the additives. Also, the concentrate samples, with and without additives, were stored at 40° F. The results obtained are tabulated below:

TABLE 5

*Inhibition of cloud loss by added fumarate in heat-treated (1 sec. at 450° F.) orange concentrate held at 40° F.*

| Expt. No. | Additive | Proportion of additive based on weight of concentrate, percent | Percentage of cloud retained after storage for— | | | |
|---|---|---|---|---|---|---|
| | | | 3 days | 5 days | 6 days | 7 days |
| 16 | none (control) | none | 65 | 37 | 24 | 11 |
| 17 | fumaric acid | 0.29 | 72 | 46 | 38 | 31 |
| 18 | do | 0.58 | 86 | 56 | 49 | 43 |
| 19 | disodium fumarate | 0.40 | 87 | 84 | 79 | 74 |
| 20 | do | 0.80 | 93 | 91 | 88 | 82 |

As demonstrated above, the stability of citrus concentrates is drastically increased by addition of fumaric acid, or more preferably the non-toxic salts thereof. The salts may be those in which one or both carboxyl groups of the fumaric acid are salified with such cations as sodium, potassium, ammonium, etc. The proportion of fumaric acid or fumarate to be used depends on the nature of the concentrate and in general may be about from 0.05 to 0.5%, based on the weight of the reconstituted juice. In adding the fumaric acid or fumarate to the concentrate, one must take into account the fold of the concentrate. For example, if the aim is to use 0.1% based on the reconstituted juice, and the concentrate is of 4-fold concentration, one would add about 0.4% of the fumaric acid (or fumarate) to the concentrate.

The preparation of the citrus juice concentrate is not a part of this invention and this material may be prepared from the juices of oranges, grapefruit, lemons, tangerines, etc. by any of the known methods. One common method involves evaporating single-strength citrus juice to a concentration of about 6-fold using evaporation under vacuum to prevent damage to the flavor and color of the juice. The resulting 6-fold concentrate is then cut back with single strength juice to restore flavor and to present a composite concentrate of 4-fold concentration. Instead of restoring flavor by addition of single-strength juice, one can accomplish this end by adding cold-pressed orange peel oil or puree of whole oranges as disclosed in the copending application of R. G. Rice et al., Serial No. 354,666, filed May 12, 1953. In this case the use of these potent flavor-restoring materials avoids dilution of the concentrate so that the juice can be directly brought to the approximate concentration level intended for ultimate use. In general, the concentrates treated in accordance with the invention may have a concentration from about 2-fold up to 8-fold, or higher. After addition of the fumaric acid or fumarate, the treated concentrate is packaged in the usual way, frozen and maintained under freezing conditions until ready to be used.

It may be noted that the minor amounts of fumaric acid or fumarate do not perceptibly alter the color, taste, odor, or nutritive properties of the juice concentrate.

To get a maximum cloud stabilizing effect it is preferable to subject the concentrate, before or after addition of the fumaric acid (or fumarate), to what may be termed a mild heat treatment. This heat treatment is to be distinguished from the severe heating commonly employed in the industry to get cloud stabilization. In accordance with this invention, the mild heat treatment involves applying a temperature of about 140–180° F. for a period of about 1 to 5 seconds, the shorter time being associated with the higher temperature in the above range, and vice versa. Such heat treatment causes no detectable change in color, flavor, or nutritive quality of the juice. It may also be noted that this mild heat treatment in itself would be insufficient to impart stability to the concentrate but in combination with the addition of fumaric acid (or fumarate) the concentrate is given a high degree of stability. This aspect of the invention is particularly demonstrated in Examples II and IV, above.

Having thus described the invention, we claim:

1. The method of increasing the cloud stability of a citrus juice concentrate which comprises incorporating into a 4- to 8-fold citrus juice concentrate solely about from 0.05 to 0.5%, based on the weight of the reconstituted juice, of an additive selected from the group consisting of fumaric acid and the non-toxic salts thereof, packaging and freezing the concentrate containing incorporated additive, and maintaining it under freezing conditions, at about 0° F., until it is to be used.

2. The method of claim 1 wherein the additive is fumaric acid.

3. The method of claim 1 wherein the additive is disodium fumarate.

4. The method of increasing the cloud stability of a citrus juice concentrate which comprises subjecting a 4- to 8-fold citrus juice concentrate to a mild heat treatment, at about 140–180° F. for a period of about 1 to 5 seconds, which is in itself insufficient to effectuate a significant cloud stabilization, incorporating into the concentrate solely about from 0.05 to 0.5%, based on the weight of the reeconstituted juice, of an additive selected from the group consisting of fumaric acid and the non-toxic salts thereof, packaging and freezing the concentrate containing incorporated additive, and maintaining it under freezing conditions, at about 0° F., until it is to be used.

5. The method of claim 4 wherein the additive is fumaric acid.

6. The method of claim 4 wherein the additive is disodium fumarate.

References Cited in the file of this patent

UNITED STATES PATENTS 2,622,032   Frandsen _____ Dec. 16, 1952

OTHER REFERENCES

Textbook "Uses and Applications of Chemicals and Related Materials," vol. II, by Thomas C. Gregory. Copyright 1944 by Reinhold Publishing Corp., New York, New York, page 147.